(12) United States Patent
Bunting et al.

(10) Patent No.: US 6,510,390 B1
(45) Date of Patent: *Jan. 21, 2003

(54) 3-D SEISMIC TRACE EXTRAPOLATION AND INTERPOLATION

(75) Inventors: Timothy John Bunting, Twickenham (GB); Philip Fontana, Sugar Land, TX (US)

(73) Assignee: WesternGeco, L.L.C., Houston, TX (US)

(*) Notice: Subject to any disclaimer, the term of this patent is extended or adjusted under 35 U.S.C. 154(b) by 114 days.

This patent is subject to a terminal disclaimer.

(21) Appl. No.: 09/679,082

(22) Filed: Oct. 4, 2000

Related U.S. Application Data

(60) Provisional application No. 60/158,078, filed on Oct. 7, 1999.

(51) Int. Cl.⁷ .................................................. G01V 1/28
(52) U.S. Cl. .......................................... 702/14; 702/17
(58) Field of Search ...................................... 702/14, 17

(56) References Cited

U.S. PATENT DOCUMENTS

| | | | |
|---|---|---|---|
| 4,594,693 A | 6/1986 | Pann et al. | 367/43 |
| 4,672,545 A | 6/1987 | Lin et al. | 364/421 |
| 4,866,659 A | 9/1989 | Lin et al. | 364/421 |
| 4,887,244 A | 12/1989 | Willis et al. | 367/73 |
| 5,235,556 A | 8/1993 | Monk et al. | 367/63 |
| 5,617,372 A | 4/1997 | Gulunay et al. | 367/38 |
| 5,677,892 A | 10/1997 | Gulunay et al. | 367/38 |
| 5,742,560 A | 4/1998 | Krebs | 367/57 |
| 5,850,622 A | 12/1998 | Vassiliou et al. | 702/17 |
| 5,924,049 A | 7/1999 | Beasley et al. | 702/17 |
| 6,021,379 A | 2/2000 | Duren et al. | 702/16 |
| 6,292,755 B2 * | 9/2001 | Chambers et al. | 702/17 |

FOREIGN PATENT DOCUMENTS

| | | |
|---|---|---|
| EP | 0551210 A2 | 7/1993 |
| GB | 2320758 A | 7/1998 |

* cited by examiner

*Primary Examiner*—Edward Lefkowitz
*Assistant Examiner*—Anthony Gutierrez
(74) *Attorney, Agent, or Firm*—David S. Figatner; Madan, Mossman & Sriram, P.C.

(57) ABSTRACT

A swath of marine seismic data is acquired using a plurality of receiver lines, at least two near sources and at least one far source. Lines of data corresponding to the far seismic source are augmented to produce additional lines of interpolated and/or extrapolated seismic data that are equivalent to that which would be produced by a second far source. This makes it possible to obtain fill coverage seismic data with a shorter cable length and also increases the acquisition speed relative to an acquisition method using two near and two far seismic sources.

14 Claims, 7 Drawing Sheets

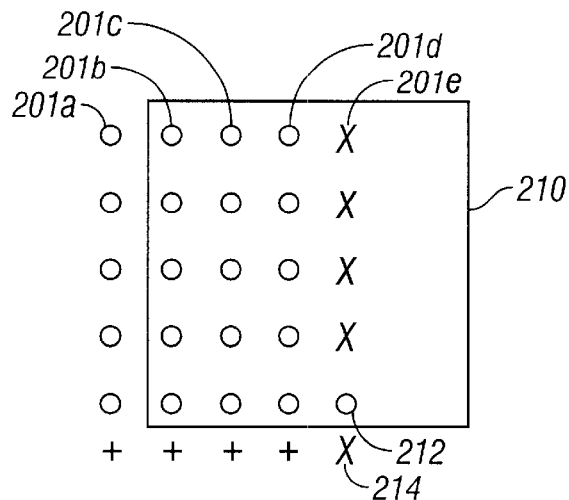
FIG. 4
*(Prior Art)*
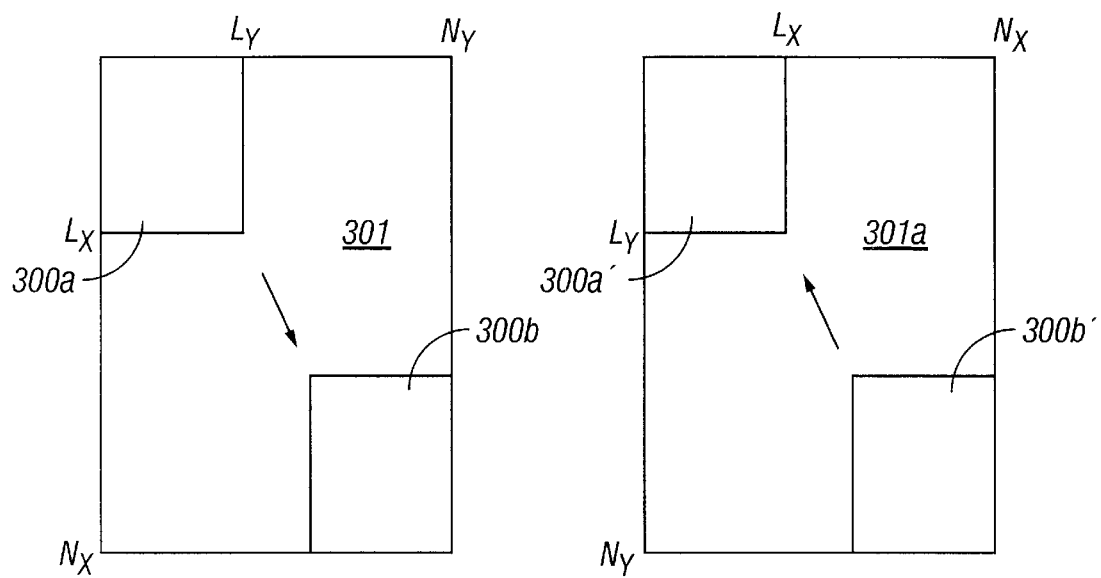
FIG. 5A
*(Prior Art)*
FIG. 5B
*(Prior Art)*

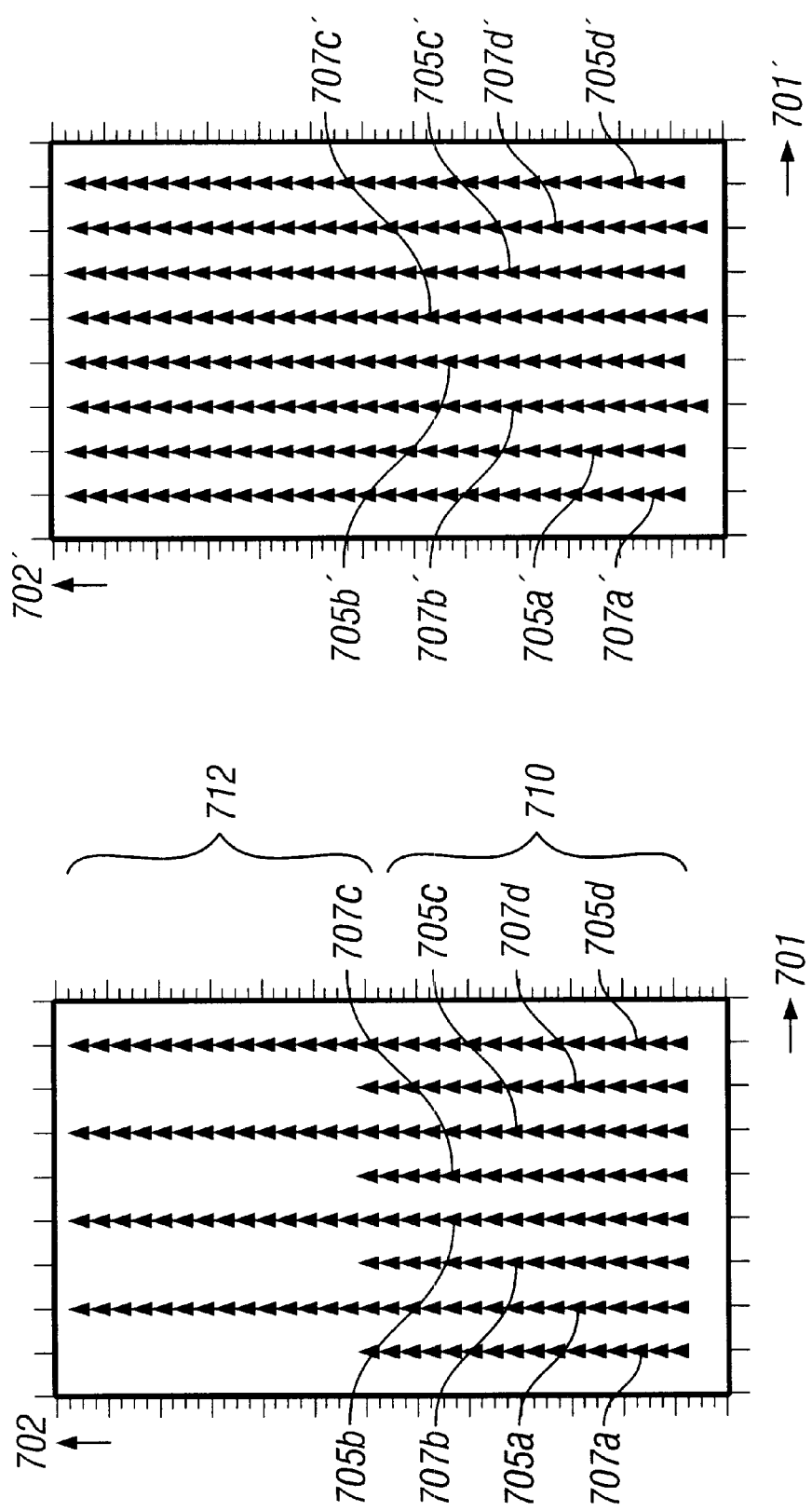

3-D SEISMIC TRACE EXTRAPOLATION AND INTERPOLATION

CROSS-REFERENCES TO RELATED APPLICATIONS

This application claims priority from U.S. Provisional Patent Application Ser. No. 60/158,078 filed on Oct. 7, 1999. This application is also related to U.S. patent application Ser. No. 09/754,135 filed on Jan. 4, 2001.

BACKGROUND OF THE INVENTION

1. Field of the Invention

This invention relates to the field of seismic data acquisition and processing. More particularly, this invention relates to a method of using 2-dimensional extrapolation techniques for predicting lines of seismic data beyond existing lines of seismic data and interpolating lines of seismic data between existing lines of seismic data.

2. Background of the Art

3-D marine seismic surveys entail towing a swath of elongated seismic sensor arrays. The swaths are repeated to increase the amount of coverage in a direction transverse to the direction of the sensor arrays. In order to reduce the cost of acquisition, it is desirable to avoid overlap of successive swaths and, if possible, not leave gaps between the successive swaths. It is an increasingly common practice in marine seismic acquisition to use two or more sources spaced apart in an inline direction to obtain a range of offsets greater than that obtainable without spaced apart sources. Shorter cables have the advantage of increased manoeuverability and less degradation of data coverage due to cable feathering.

U.S. Pat. No. 6,292,755 based on U.S. patent application Ser. No. 09/754,135, a continuation of U.S. patent application Ser. No. 09/337,116 (now abandoned) to Chambers et al, having the same assignee as the present application and the contents of which are fully incorporated herein by reference, discloses a method for interpolation and extrapolation of cables of seismic data that may be applied to any form of seismic operation, be it on land or on sea. The teachings of Chambers are applied herein to the problem of maintaining uniformity of coverage in multiple source marine seismic data acquisition.

In 3-D marine operations, a seismic ship tows a swath including a plurality of parallel seismic streamer cables along a desired line of survey, the cables being submerged by a few meters beneath the water surface. The number of cables that make up a swath depends only on the mechanical and operational capabilities of the towing ship. There may be six or more such cables, spaced about 50 to 100 meters apart. The respective cables may be up to 8 to 12 km. long.

Each streamer cable typically includes 120 or more spaced-apart seismic detector groups. Each group consists of one or more individual interconnected detectors, each of which services a single data channel. The group spacing is on the order of 25 to 50 meters longitudinally along the cable. The seismic detectors are transducers that perceive the mechanical activity due to reflected acoustic wavefields and convert that activity to electrical signals having characteristics representative of the intensity, timing and polarity of the acoustic activity as is well known to the art. The detectors are operatively coupled to data-storage and processing devices of any desired type.

An acoustic source such as an array of air guns, is towed in the water by the ship near the leading end of the swath of seismic streamer cables. As the ship proceeds along the line of survey, the source is fired (activated) at selected spatial intervals, commonly equal to the group interval. Assuming the ship travels at a constant velocity such as 4–6 knots, the source may be conveniently fired at selected time intervals such as every 5–13 seconds or more. The wavefield emitted by the source, travels downwardly to be reflected from subsea earth formations whence the wavefield is reflected back to the water surface where the reflected wavefield is received by the detectors and converted to electrical signals. The detected electrical signals are transmitted to any well-known signal recording and processing means for providing a physical model of the subsurface.

FIG. 9 shows an example of seismic data acquired using a two-boat seismic operation is illustrated in which a swath of coverage 613 is obtained using a plurality of cables C1, C2, C3 ... towed by a first boat 614. FIG. 10a shows the resulting CMP coverage obtained using the acquisition geometry of FIG. 9. A major problem with the CMP coverage is evident: half the lines of CMP bins have a range of offsets that corresponds to the full length of the cable while the other half of the lines have a maximum inline offset that is one-half of the cable length. The crossline positions of the sources could be adjusted so that all the lines of CMP bins would have the full range of offsets; however, such a configuration typically leads to duplicate coverage of many CMP bins, something that is obviously inefficient.

Interpolation of data between existing cables is one possible solution to the problem. The present invention addresses the need for such extrapolation and interpolation of cables of seismic data.

SUMMARY OF THE INVENTION

In order to provide a larger range of offsets in marine seismic data acquisition, two spaced apart boats are commonly used. However, with many acquisition geometries, a full range of offsets is not obtainable in all CMP bins. The present invention is a method for extrapolating and interpolating seismic data acquired with such a geometry to obtain a full range of offsets. At each frequency slice of a space gate, a 2-D prediction error filter that can predict the data in forward and backward directions is designed. A prediction filter is obtained from the prediction error filter and applied to a cable at an edge of the space gate to predict a first missing cable. By repeating this process using overlapping inline gates, overlapping inline gates of the extrapolated cables may be obtained. By suitable weighting of the inline gates of the extrapolated cables, a complete cable length is extrapolated. The process may be repeated using the first extrapolated cable in the derivation to give additional extrapolated cables. A similar prediction process is used to interpolate missing cables between existing swaths of 3-D seismic data. Another embodiment of the invention is used for interpolating and extrapolating missing data in a multiple boat acquisition geometry where seismic sources are deployed from at least two spaced apart boats to obtain longer source-receiver offsets

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 4 (PRIOR ART) shows the application of a prediction filter to obtain data locations on an extrapolated cable.

FIGS. 5A, 5B (PRIOR ART) show the derivation of a 2-D prediction filter.

FIGS. 10a and 10b show the inline and crossline coverage obtained at an exemplary point using the geometry of FIG. 9 and the use of the present invention to fill in missing portions of seismic lines.

DETAILED DESCRIPTION OF THE PREFERRED EMBODIMENTS

By way of background, material from Chambers is described here with reference to FIGS. 1–8 to understand the process of obtaining a cable of interpolated or extrapolated data.

Figure 1:
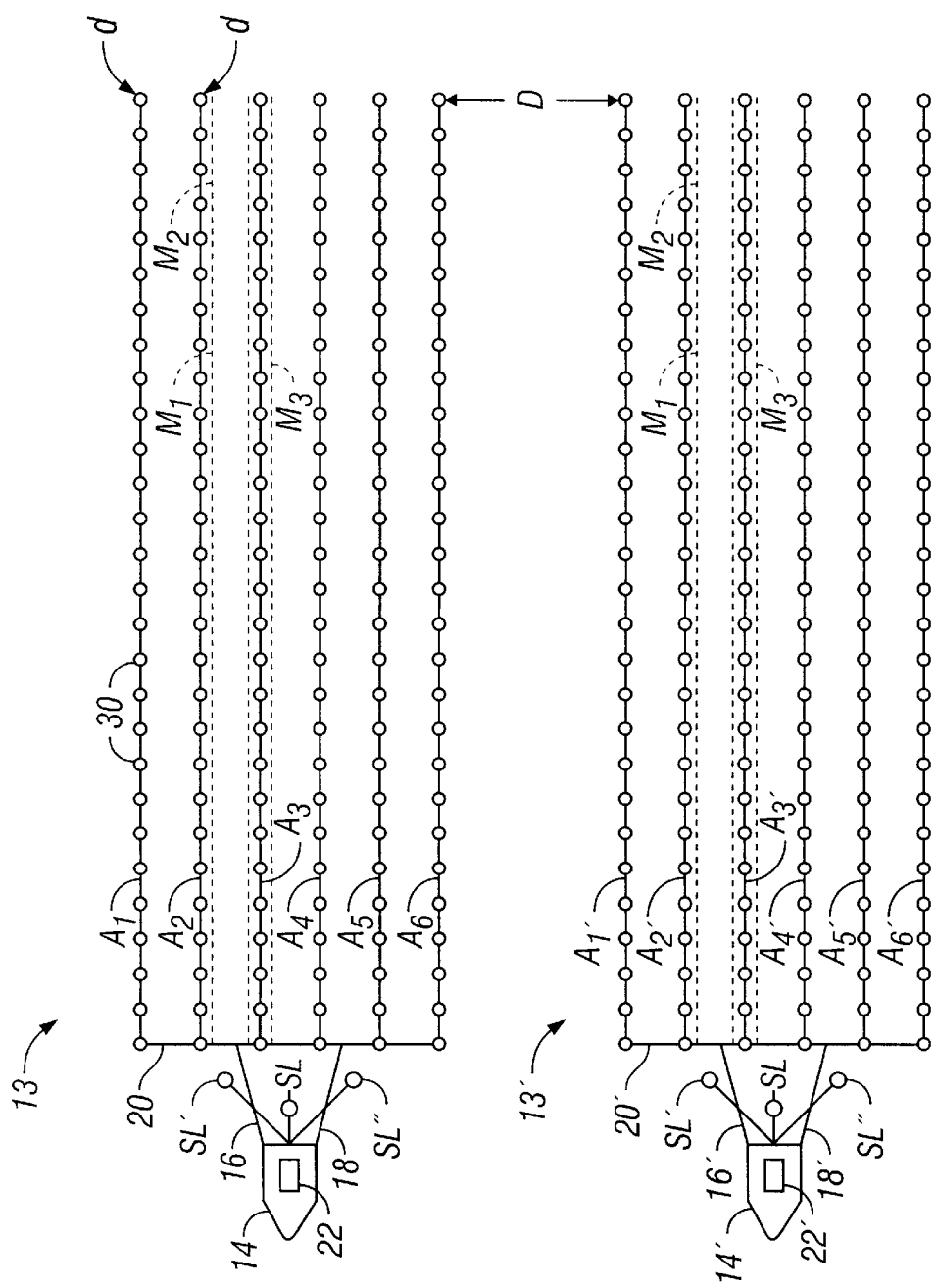
FIG. 1 (PRIOR ART) is a schematic illustration of a marine seismic data acquisition illustrating two swaths of 3-D acquisition.

FIG. 1 (PRIOR ART) is a plan view of a 3-D seismic survey acquisition. A first 3-D swath 13 of six parallel seismic cable arrays A1–A6 are towed through a body of water by a ship 14. The cables are typically configured to be a distance d apart. It should be understood that six cables are shown only as an example, and a greater or lesser number of cables could be used in the acquisition. Signals from the respective cable arrays A1–A6 are fed over a data-signal manifold 20 to a processor 22 of any well-known type, installed on ship 14 and operatively coupled to the processor 22 by electrical lead-ins 16 and 18. A discrete acoustic source SL is towed by ship 14 near the leading end of swath 13, substantially at the center of the swath. More than one discrete source such as SL' and SL", offset from the center line may be used if desired.

A second 3-D swath 13' of six parallel seismic cable arrays A1'–A6' may be obtained by towing the cables at a position that is laterally offset from the first swath 13. This may be done by a ship 14'. It should be understood that the second swath could be obtained at a later time than the first swath, so that the ship 14' could be the same as the ship 14, or it could be acquired simultaneously with the acquisition of the first swath 13 using a second ship. Without limitation, the invention is discussed herein as if the difference swaths are acquired at different times using the same ship.

Those versed in the art would recognize that in order to minimize the cost of seismic data acquisition, the distance D between the two swaths 13 and 13' should, at the very least, be the same as the distance d between the cables. If this is not done, there will be unnecessary duplication of data. Those versed in the art would also recognize that if the distance D is greater than the distance d, data acquisition costs could be reduced if the data within the gap between the swaths could be filled in by simulating data that would be acquired by cables within the gap. The term "gap" here is not limited to spatial gaps in the acquisition geometly and is particularly intended to include a gap in the illumination of the subsurface by the seismic acquisition. The term "insonification" has sometimes been used to describe illumination by sound waves. The quality of a processed image that is based partially on such simulated data depends upon how the simulation is done. Even if only one swath of data is acquired, it would be desirable to simulate additional cables of data that are simply extrapolated away from an existing swath of data. Another problem that is encountered in 3-D seismic data acquisition is that of aliasing, wherein due to inadequate sampling of data, certain frequencies and/or dips in the subsurface cannot be properly imaged.

Figure 2A:
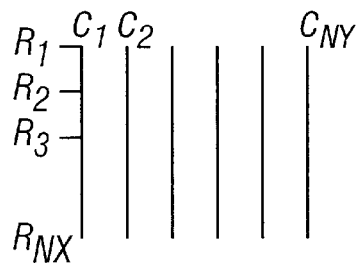
FIGS. 2A, 2B (PRIOR ART) show the extrapolation of cables from an existing set of seismic cables.

Referring now to FIG. 2A, a schematic illustration of a portion of locations on a 3-D seismic acquisition survey are shown. A plurality of seismic lines $C_1, C_2, C_3 \ldots C_{ny}$ are shown and a plurality of seismic receiver locations $R_1, R_2, R_3 \ldots R_{nx}$ on each of the plurality of seismic lines are indicated. For simplifying the illustration, the receiver locations are indicated only one cable. As discussed in the background above, the plurality of seismic lines in a conventional marine seismic survey are comprised of cables connecting the receivers. However, the present invention includes seismic surveys in which the survey may be carried out on land, or surveys in which the receivers along seismic lines transmit received data by telemetry. For convenience, in the following discussion, the term "cable" is used to encompass all of these arrangements of seismic lines having receivers along them.

Figure 2B:
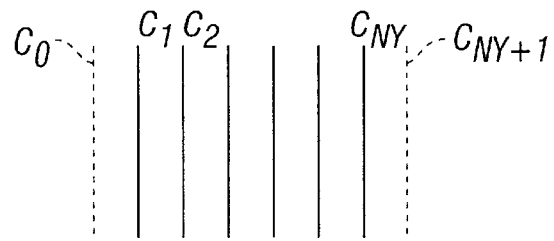

The plurality of cables $C_1, C_2, C_3 \ldots C_{ny}$ and the plurality of receivers $R_1, R_2, R_3 \ldots R_{nx}$ define a spatial gate of size $n_x \times n_y$ locations in the x- and y-directions. The number $n_x$ of receiver locations in the cable used in the gate will, in general, be less than the number of available data channels on the cable: the latter number is typically 120 or more. Using an extrapolation method using a prediction filter described below with reference to FIG. 4, this spatial gate of $n_x \times n_y$ locations may be used to define a gate of length $n_x$ of an extrapolated cable denoted by $C_{ny+1}$ as indicated in FIG. 2B. Using a conjugate flipped version of the prediction filter, a cable denoted by $C_0$ as indicated in FIG. 2B may also be obtained, i.e., the extrapolated cable may be on either side of the existing plurality of cables $C_1, C_2, C_3 \ldots C_{ny}$.

Figure 3:
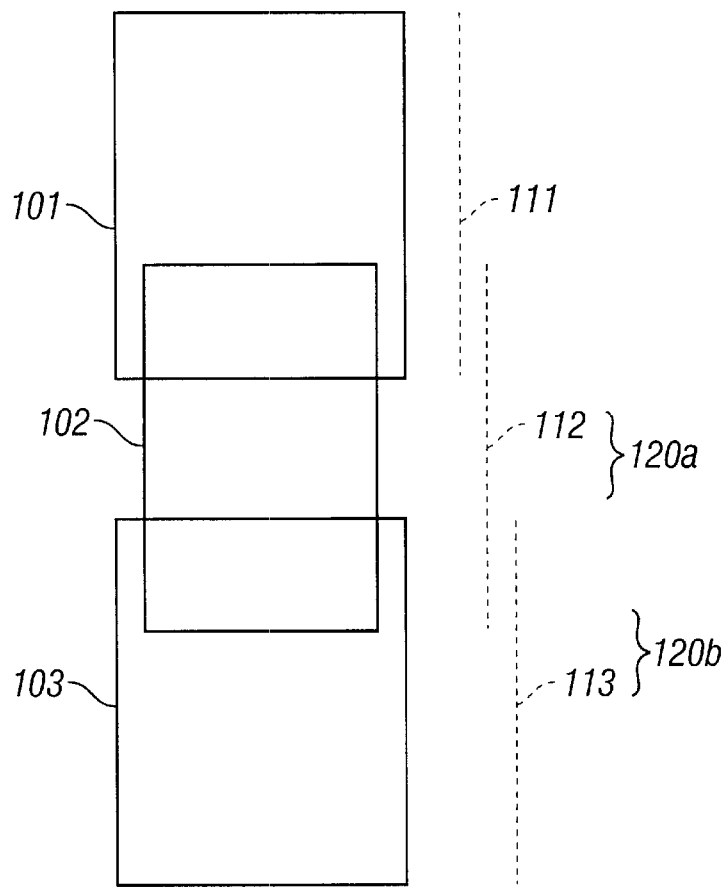
FIG. 3 (PRIOR ART) illustrates the use of overlapping spatial gates to obtain an extrapolated cable.

Turning now to FIG. 3, a number of overlapping spatial gates 101, 102 and 103 are shown. Each of the gates is $n_x$ in length, and $n_y$ wide, as in FIGS. 2A and 2B above. Using data from gate 101, a gate of length $n_x$ is obtained on an extrapolated cable as discussed above. This extrapolated gate is denoted by 111. Similarly, the gates 102 and 103 on the spatial gates are used to produce extrapolated gates 112 and 113. This is continued for the entire length of the cables (not shown) to produce extrapolated gates that span the length of the cables.

As seen on FIG. 3, there is a region of overlap 120a between the extrapolated gates 111 and 112, and a region of overlap 120b between the extrapolated gates 112 and 113. Using known methods, the data in the extrapolated cable within the overlap regions 120a and 120b may be combined, and by repeating the process for any additional gates, an entire cable of data may be extrapolated. In a preferred embodiment of the invention, a tapered weighting function is applied to the data with 111 and 112 in the overlap zone 120a and the weighted extrapolated data from 111 and 112 summed. Commonly used tapering techniques, as would be known to those versed in the art, include a linear tapering or a cosine function.

As noted above, the number of receivers in a survey is 120 or more, with six being a typical number for the plurality of cables $n_y$. In a preferred embodiment of the invention, the extrapolation to an additional cable is done by applying a prediction filter to the received seismic data on the $n_y$ cables. The space gate discussed above with reference to FIG. 3 has a length $n_x$ that is preferably ten or more receiver group intervals. The prediction filter is derived within each space gate as described below with reference to FIGS. 4–6.

FIG. 4 shows the manner in which points on an extrapolated cable are obtained when a prediction filter has been derived as discussed below. Shown by dots are a plurality of receiver locations on existing cables 201a, 201b, 201c and 201d. For illustrative purposes only, the prediction filter is a 5×4 filter for extrapolating data. The prediction filter uses data from the existing cables within the 5×4 box denoted by 210. This data includes previously determined points denoted by x's along an extrapolated cable 201e. Application of the 5×4 filter to the data within the box 210 gives an output trace at location 212 denoted by the open circle. The process is then repeated moving the box 210 in the x-direction by one trace, using the data traces denoted by +'s on the existing cables and the trace at location 212 to give a new output trace at location 214. This process is repeated for all traces within a spatial gate as defined above in the discussion of FIG. 3. Those versed in the art would recognize the existence of an "end effect" at the beginning of the extrapolation process in generating the first few traces on an extrapolated cable.

The process discussed above in reference to FIG. 4 may be repeated using an extrapolated cable as part of the input to provide second and additional extrapolated cables of predicted seismic data.

Extrapolation of cable data in the other side of existing data, i.e., to the left in FIG. 4 is done by using a filter that is the flipped and complex conjugate of the filter used for extrapolation to the right.

The design of a 2-D filter is discussed with reference to FIGS. 5A and 5B. Shown is a space gate of size $n_x \times n_y$. Each point in the space gate is a trace of seismic data defining a volume in the (x, y, t) space. In a preferred embodiment of the invention, the data are Fourier transformed in time, giving a data volume in (x, y, $\omega$) space, where $\omega$ is the angular frequency $2\pi f$. A separate filter is derived for each frequency $f$, or equivalently, $\omega$.

Referring now to FIG. 5A, a region of size $l_x \times l_y$ denoted by 300a shows the size of the filter. The design of a two dimensional prediction error filter of size $l_x \times l_y$ over a two dimensional space gate of size $n_x \times n_y$ is done by writing down the convolutional equation equations stating that the forward prediction filter annihilates data points from $(l_x, l_y)$ to point $(n_x, n_y)$ as denoted by the arrow 301 in FIG. 5A. Similarly, the conjugate flipped version of the same filter can annihilate data in the reverse direction from the point $(n_x-l_x+1, n_y-l_y+1)$ to the point $(1,1)$ as indicated by the arrow 301a in FIG. 5B.

Denoting the prediction error filter e by $$e = [E_{1,1}, E_{2,1} \ldots E_{lx,1}, E_{1,2}, E_{2,2} \ldots E_{lx,2} \ldots E_{1,ly}, E_{2,ly} \ldots E_{lx,ly}]^T \quad (1)$$

where the $[\ ]^T$ denotes the transpose, the filter equation is written in the form Xe=n where e is the prediction error filter, a vector of length $l_x l_y$, X is a data matrix of size 2 $(n_x-l_x+1)(n_y-l_y+1)$ by $l_x l_y$, and n is a noise vector of length 2 $(n_x-l_x+1)(n_y-l_y+1)$.

The prediction error filter e is solved using the criterion that the noise vector and the signal can only correlate at lag 0, i.e., $$X^{T^*} X e = [1, 0, 0, 0 \ldots 0]^T \quad (2)$$

where the * stands for complex conjugate. The matrix $X^{T^*} X$ is a square matrix of dimension $l_x l_y$. Equation (2) is solved for the filter coefficients e. A necessary condition for equation (2) to have a unique solution is that the number of equations given by equation (1) must be larger than the number of unknowns, i.e., $$2(n_x-l_x+1)(n_y-l_y+1) > l_x l_y.$$

Those versed in the art would recognize that the embodiment described above for the filter derivation is free of edge effects, i.e., the filter is designed without running off the edges of the space window. The autocorrelation resulting from this kind of design is called a non-windowed autocorrelation. This method is also referred to as a modified covariance method. The method makes no assumptions about data that is outside the space gate used in the filter derivation. In an alternate embodiment of the invention, a so-called windowed autocorrelation may be used. Such a windowed autocorrelation gives a filter that is less sensitive to prewhitening noise than the non-windowed method, i.e., it is more robust filter. However, a non-windowed autocorrelation is more effective at prediction than the windowed approach. The description above of the derivation and application of the 2-D filter is for exemplary purposes only and other methods known to those versed in the art could be used for the filter derivation and application.

Figure 6:
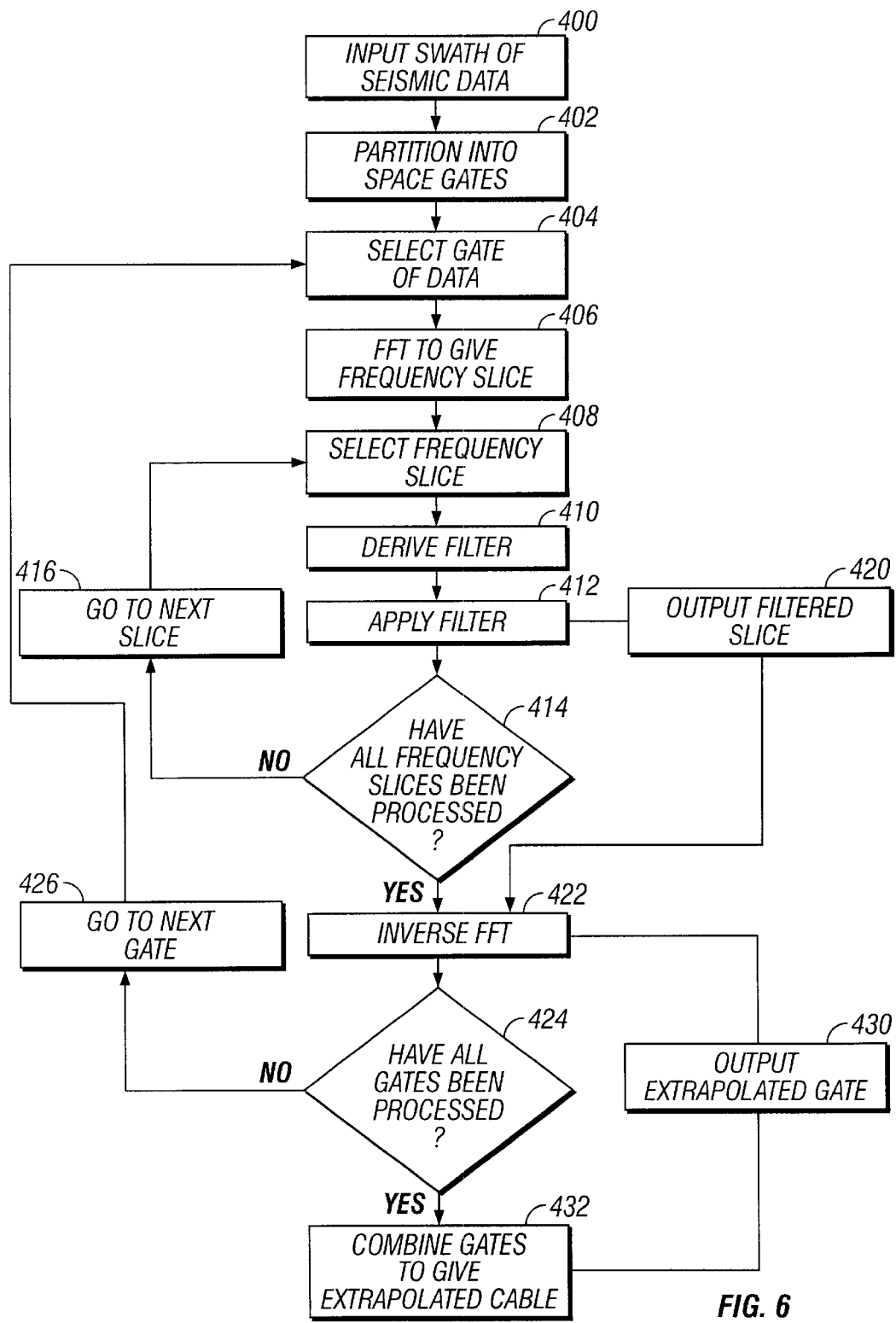
FIG. 6 (PRIOR ART) is a flow chart of some of the steps of the present invention.

FIG. 6 gives a flow chart illustrating the major steps of the present invention. An input swath of seismic data 400 comprising a plurality of cables is partitioned into spatial gates as discussed above with reference to FIG. 3. An initial gate of data is selected for processing 404. The data are transformed from the (x, y, t) domain to the (x, y, $\omega$) domain by using a method such as a Fast Fourier Transform (FFT). This gives a number of frequency slices over a range of frequencies 406 for the selected space gate 404. A frequency slice is selected 408 for filter derivation as discussed above with reference to FIG. 5. The filter is applied 412 and a frequency slice is output 420. A check is made to see if all the frequency slices have been processed 414. If not, 416, processing proceeds to the next frequency slice 416 and back to 408. If the check at 414 indicates that all frequency slices have been processed, then the output filtered slices 420 are inverse Fourier transformed 422 to give an output gate on an extrapolated trace 430. A check is made to see if all the space gates been processed 424. If not, the processing proceeds to the next gate 426 and back to 404. If all the gates have been processed, then the output extrapolated gates are combined as discussed above with reference to FIG. 3. It is to be understood that the processing described in FIG. 6 is equally applicable to the extrapolation of cables in either direction, as discussed above.

The present invention may also be used, with slight modification, to the problem of interpolating cables at locations intertwined within a swath of existing cables. In a preferred embodiment of the present invention, the method described in U.S. Pat. No. 5,677,892 (the '892 patent) issued to the same inventors and having the same assignee is used. The '892 patent, the contents of which are fully incorporated here by reference, deals with the problem of unaliased spatial trace interpolation in the F–K domain of a 3-D volume of data. The traces along the plurality of seismic cables are used to define a 3-D data volume wherein the first spatial coordinate is the receiver position and the second spatial coordinate is the cable number. To obtain the dealiased (interpolated) data set, L−1 zero terms are inserted in each direction (x and y) and an interpolation filter that will fill in these dead traces is sought. Such a filter is designed from (1/L)th lower temporal frequencies of the "zero padded" and "aero padded, zero-masked" versions of the original data. In the context of the present invention, the input 3-D data volume comprises a plurality of cables ( the y-coordinate of the data volume of the '892 patent), each of the cables having a plurality of traces ( the x-coordinate of the data volume of the '892 patent). The end result of applying the method of the '892 patent is to produce interpolated cables in which receivers are also interpolated. The present invention discards the interpolated receiver positions along the original and interpolated cables to produce a set of interpolated cables having the same receiver spacing as in the original cables.

An alternate embodiment of the present invention uses a modification of the method of U.S. Pat. No. 5,617,372 (the '372 patent) issued to the same inventors as the present application and having the same assignee, teaches a method of interpolation of seismic traces within a single cable. The contents of the '372 patent are fully incorporated herein by reference and the method therein is used to interpolate cables between existing cables of seismic data.

Figure 7:
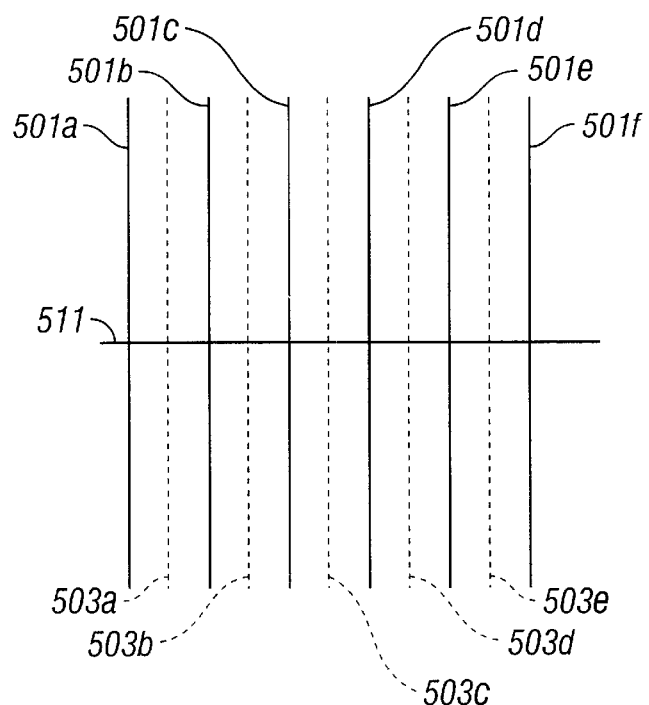
FIG. 7 (PRIOR ART) shows the interpolation of cables within an existing swath of a seismic survey.

This is illustrated in FIG. 7 wherein six cables of data 501a, 501b, 501c, 501d, 501e and 501f are shown. In an alternated embodiment of the present invention, additional cables of data 503a, 503b, 503c, 503d and 503e are obtained by a process of interpolation of data from the existing cables.

Figure 8:
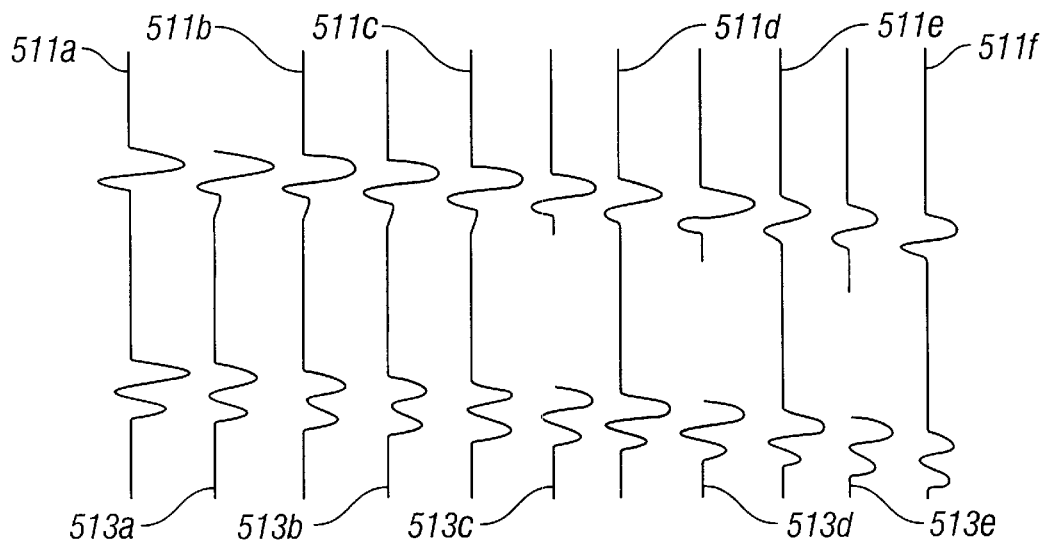
FIG. 8 (PRIOR ART) shows the interpolation of individual traces at a receiver location from traces on an existing seismic swath.

The method of obtaining a single trace on an interpolated cable is discussed with reference to a receiver station 511 on the swath of data. Referring now to FIG. 8, the seismic traces at position 511 on the six cables 501a . . . 501f are denoted by 511a . . . 511f. The vertical axis in FIG. 8 is time. Using the method of the '372 patent, additional traces are interpolated at locations between the locations on the existing cable to give traces 513a . . . 513e. The method of the '372 patent comprises a transformation of the data from the space-time coordinates (y and t in the present context) to frequency-wavenumber coordinates ($k_y$ and $\omega$ in the present context), with the interpolation being done in the transformed domain. This is followed by a transformation back to the space-time domain.

This interpolation process is then repeated for other station locations on the existing swath, making it possible to produce entire cables of interpolated data 503a. . . 503e.

Figure 9:
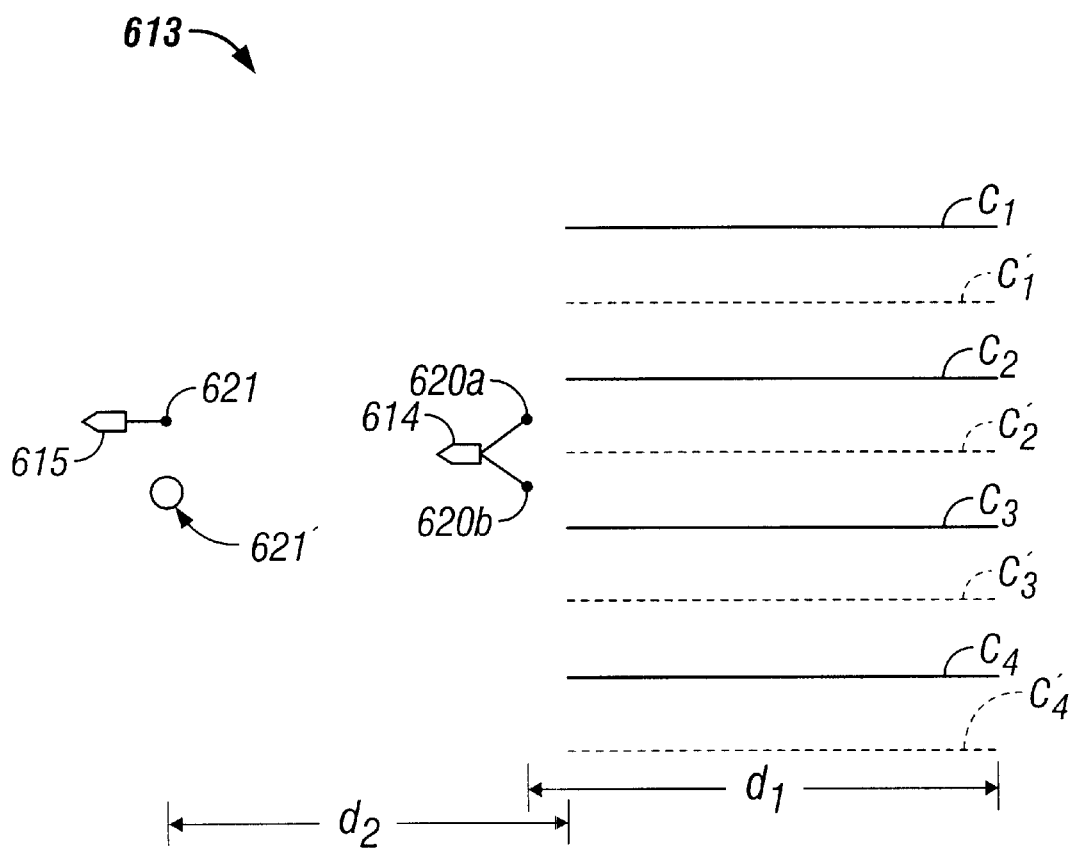
FIG. 9 shows an arrangement in which seismic sources are deployed from two spaced-apart boats to obtain increased offset.

Turning now to FIG. 9, a two-boat seismic operation is illustrated in which a swath of coverage 613 is obtained using a plurality of cables C1, C2, C3 . . . towed by a first boat 614. For illustrative purposes only and not by way of limitation, only four cables are shown. For simplifying the illustration, four streamers are shown and the individual receivers on the streamers are not indicated. A pair of seismic sources 620a and 620 , called the "near" sources are deployed behind the boat 614. The crossline separation of the near sources is one half the separation between the streamers. A second boat 615 with a second seismic source 621 deployed therefrom is indicated at a distance from the first boat. This second source is called the "far" source. The inline distance $d_1$ from sources 620a, 620b to the far end of the cables C1, C2 . . . defines a maximum inline source-receiver distance for the near source. The second source 621 is deployed so that the minimum inline distance $d_2$ from the second source to the near end of the cables C1, C2 . . . is preferably less than $d_1$. With this arrangement, those versed in the art would recognize that there would be no inline gap in the seismic coverage.

The second boat could have more sources. With this arrangement, it is possible to obtain longer source to receiver offset distances for a fixed length cable than in an arrangement in which sources are deployed from only a single boat. This increased source-receiver offset comes at the cost of having a second acquisition vessel. The first boat and the second boat travel along substantially parallel lines. By suitable timing of the activation of the near sources 620a, 620b and the far source 621, seismic data may be acquired without overlap of signals from the near and far sources within an interval of interest.

FIG. 10a shows is a coverage plot at an exemplary location of a portion of the CMP coverage obtained with this acquisition geometry. The coverage plot is based upon a binning of the various shot-receiver combinations that have a common midpoint at the exemplary location. This type of plot is well-known to those versed in the art and is obtained by taking all combinations of sources and receivers in the data set and sorting them into a common midpoint sort wherein all source-receiver combinations that have a common midpoint are grouped together. The abscissa 701 is the crossline-receiver distance and the ordinate 702 is the inline source-receiver distance.

For the acquisition geometry of FIG. 9, the far source is substantially inline with the source 620a. The CMP lines 707a, 707b, . . . 707d are obtained as a result of data from the near source 620b recorded in cables C1, C2, . . . C4. Portions of the CMP lines 705a, 705b . . . 705d having an inline source receiver offset within the range indicated by 710 correspond to data from the near source 620a recorded into C1, C2, . . . C4 while those portions of CMP lines 705a, 705b . . . 705d having an inline source receiver offset within the range indicated by 712 correspond to data from the far source 621 recorded into C1, C2, . . . C4.

As can be seen in FIG. 10A, for the acquisition geometry of FIG. 9, there are some cross-line distances for which there is a fill range of inline source-receiver offsets. while for the other cross-line distances there are no traces corresponding to the full range of in-line offsets. Such an insonification of the subsurface is undesirable.

By using the method described above with reference to FIGS. 2–8, the data for the source 621 are augmented to give the additional lines of cable data C1', C2' and C3' (by interpolation) and an additional line of cable data C4' (by extrapolation). The resulting CMP coverage is given in FIG. 10b where it can be seen that a complete range of inline and crossline offsets is present.

Those versed in the art would recognize that these additional lines of augmented seismic data C1', C2', C3', C4' are equivalent to recording data from a second far source 621' into the cables C1, C2, . . . C4. However, those versed in the art would recognize that having a real source at the location 621' and acquiring data therefrom would slow down the speed of acquisition of seismic data because data from each of the acquisition cycle would now involved firing of four sources in sequence rather than just three.

While this particular embodiment has been discussed using four seismic lines, a near source boat having two seismic sources and a far source boat having two sources, the method may be used for any combination of seismic lines, sources and source boats. The geometry shown in FIGS. 10a–10b would change depending upon the crossline receiver spacing, the crossline source spacing and the inline source spacing between the near and far receivers, but the basic method of extrapolation and interpolation discussed above may be used for infilling of data. For example, instead of using two near sources, data could be acquired using one near source and one far source: in such a case, the augmentation of data would be done for both the near and the far source to provide additional lines of seismic coverage.

The advantages of the shooting geometry of FIG. 9 when combined with the cable interpolation method of the present invention to give the subsurface coverage of FIG. 10b are numerous. There is a reduction in the cost of the cables since the streamer length may be reduced by 50% without a reduction of the maximum inline offset and the maximum crossline offset. Alternatively, for a given cable length, increased inline offsets are obtained along with finer crossline sampling. The reduced streamer length also means that the effects of cross-currents in terms of cable "feathering" are reduced. The shorter steamer length also makes it possible to approach obstacles more closely.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of seismic prospecting comprising:
   (a) sequentially activating at least one near seismic source and at least one far seismic source to propagate seismic waves into the earth's subsurface, said at least one near seismic source and said at least one far seismic source spaced apart in an inline direction;
   (b) receiving reflections of the propagating seismic waves from at least one reflecting interface in the subsurface along a plurality of receiver lines, each receiver line including a plurality of seismic receivers, to give received seismic data along the plurality of receiver lines; and
   (c) augmenting said plurality of lines of received seismic data to give a plurality of lines of augmented seismic data.

2. The method of claim 1 wherein the at least one near source further comprises at least two sources spaced apart in a crossline direction.

3. The method of claim 2 further comprising repeating steps (a) and (b) a plurality of times for a plurality of positions of the at least two near sources and the at least one far source displaced in an inline direction from initial positions thereof and sorting the received seismic data to give a plurality of common-midpoint (CMP) gathers of sorted data having a full range of inline offsets.

4. The method of claim 1 wherein the plurality of receivers on each receiver line communicate data to a processor by at least one of (i) a cable connecting the plurality of receivers on each receiver line, and (ii) telemetry.

5. The method of claim 1 wherein the at least one first seismic source is deployed on a boat proximate to the plurality of receiver lines and the at least one second seismic source is deployed on a boat distant from the plurality of receiver lines.

6. The method of claim 1 wherein augmenting said plurality of lines further comprises at least one of (i) interpolating said plurality of lines of receiver data, and, (ii) extrapolating said plurality of lines of receiver data.

7. The method of claim 6 wherein the plurality of lines of augmented seismic data comprises at least one line of extrapolated data, the method further comprising:
   A. defining at least one space gate on the received seismic data; and
   B. deriving at least one prediction filter using the received seismic data within the at least one space gate for predicting the received seismic data within said space gate, said prediction filter having a smaller size than the at least one space gate.

8. The method of claim 7 further comprising applying said at least one prediction filter to the received seismic data to give at least one gate on said at least one line of extrapolated data.

9. The method of claim 6 wherein the plurality of lines of augmented seismic data comprises at least one line of interpolated seismic data; the method further comprising:
   A. defining a 3-D data volume wherein a first spatial dimension is the plurality of cables, a second spatial dimension is the plurality of seismic receivers, and the third dimension is time;
   B. zero-padding of the data in the 3-D data volume in the first and second spatial dimensions as well as in time to provide a zero-padded data volume;
   C. executing a masking operation to the zero-padded data volume to provide a zero-padded, zero-masked data volume;
   D. defining a transformed domain wherein a first transformed dimension is a wavenumber in the first spatial dimension, the second transformed dimension is a wavenumber in the second spatial dimension, and the third transformed dimension is frequency;
   E. transforming the zero-padded data volume to produce a first transformed data volume in the transformed domain;
   F. transforming the zero-padded, zero-masked data set to produce a second transformed data volume in the transformed domain;
   G. defining an interpolation operator in the transformed domain as a ratio of the first transformed data volume and the second transformed data volume and by keeping only the lower frequency components (by factor 1/L);
   H. inserting L−1 zero traces in each spatial dimension of the 3-D data volume to form a zero-inserted data volume;
   I. transforming the zero-inserted data volume to the transformed domain to give a transformed zero-inserted data volume;
   J. applying the interpolation operator to the transformed zero-inserted data volume to give a transformed interpolated data volume;
   K. inverse transforming the transformed interpolated data volume to give an interpolated data volume; and
   L. discarding traces from the interpolated data volume in the second spatial dimension.

10. A method of seismic prospecting to obtain full coverage common mid point (CMP) gathers of data with a specified maximum inline offset, the method comprising:
   (a) using at least two near seismic sources and at least one far seismic source spaced apart from the at least two near seismic sources for propagating seismic waves into the subsurface of the earth, said at least two near seismic sources and said at least one far seismic source traveling substantially in an inline direction;
   (b) receiving data indicative of a response of subterranean formations to said propagating seismic waves on receivers along a plurality of spaced apart receiver lines having a length substantially equal to one half of said specified maximum inline offset;

(c) augmenting at least a subset of said plurality of lines of received seismic data corresponding to said at least one far seismic source to produce a plurality of lines of augmented seismic data; and (d) repeating steps (a)–(c) a plurality of times for a plurality of positions of the at least two near sources and the at least one far source and sorting the received seismic data to give a plurality of common-midpoint (CMP) gathers of sorted data having substantially full coverage.

11. The method of claim 10 wherein augmenting said subset of lines further comprises obtaining at least one line of interpolated seismic data.

12. The method of claim 10 wherein said at least two near sources have a maximum inline offset from receivers in said plurality of receiver lines substantially equal to one half of said specified maximum inline offset and said at least one far source has a minimum inline offset from said plurality of receive lines substantially equal to one half of said specified maximum inline offset.

13. The method of claim 10 wherein said at least two near sources are spaced apart in a crossline direction a distance equal to one half of a crossline distance between a pair of receiver lines.

14. The method of claim 13 wherein said at least one far source is substantially inline with one of the at least two near sources.

* * * * *